C. McINTOSH.
Seed-Dropper.

No. 61,551.

Patented Jan. 29. 1867

Witnesses:
John F. Seymour
John G. Cocker

Inventor:
Clark McIntosh

United States Patent Office.

CLARK McINTOSH, OF UTICA, NEW YORK.

Letters Patent No. 61,551, dated January 29, 1867.

---

IMPROVEMENT IN SEED-SOWER.

---

The Schedule referred to in these Letters Patent and making part of the same.

---

TO ALL WHOM IT MAY CONCERN:

Be it known that I, CLARK McINTOSH, of Utica, Oneida county, New York, have invented a new and useful Improvement in Seed-Sowers, more particularly adapted to clover and grass seed.

The nature of my invention consists in the construction of a seed-sower in such form that it may be carried, by means of a strap, over the shoulders, and while being steadied by one hand, a slight movement of the other will sow regularly and evenly a space in width equal to the length of the machine and as rapidly as the person using it can walk. It may also be connected with a wheeled or other vehicle and operated automatically by the wheels or other moving parts of the vehicle.

And I do hereby declare that the following is a full, clear, and exact description of the construction and mode of operation thereof, reference being had to the annexed drawings, in which—

Figure 1:
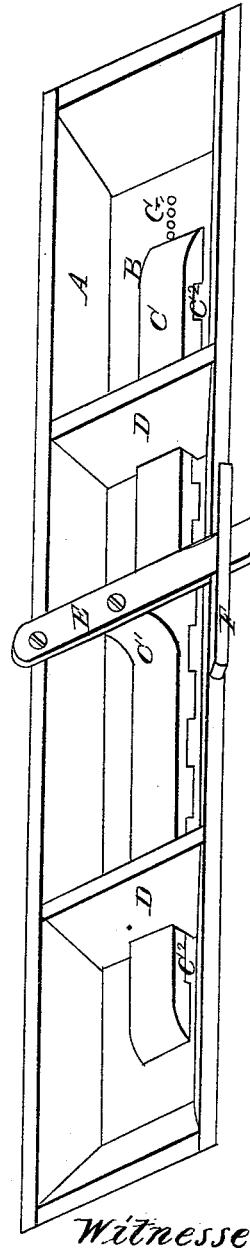
Figure 2:
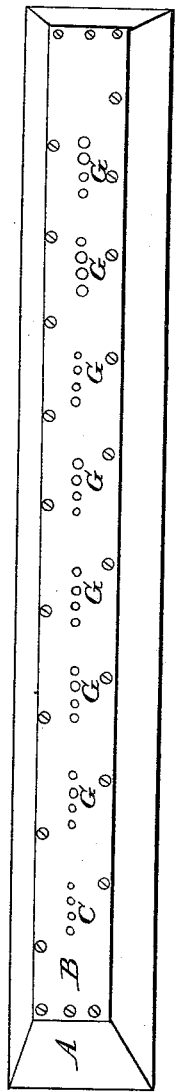
Figure 3:
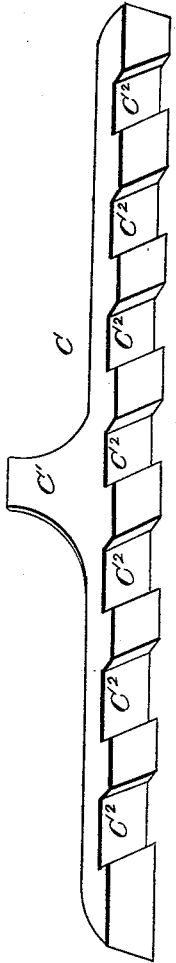

Figure 1 is a perspective view thereof.
Figure 2 is a perspective view of the under side of the hopper; and
Figure 3 a perspective view of the valve or stopper.

A is the box or hopper; B is the bottom thereof; C is the valve or stopper; $C^1$ is an arm or stud thereon to connect with the lever E; $C^2$ $C^2$ $C^2$ are notches on the under side of the valve C, through which the seed passes to the apertures G G G; D are cross-partitions; E is a lever for moving the valve or stopper; F is a staple for keeping the lever in place and regulating the throw thereof. The hopper should be of light, thin wood, say twelve feet in length, and three inches in width at the top, two at the bottom, and three in depth, all measured on the inside, with cross-divisions, D, say two feet apart, to give strength to the sides as well as to aid in regulating evenly the seed in the hopper. The hopper is open at the top and the bottom is covered with sheet metal. Longitudinally through the centre is a row of holes of a size to pass a single seed at a time, arranged in a series of say about four together, with a blank space of equal length between, as seen in fig. 2.

The valve or stopper is of light wood. On its under surface there are cut diagonal notches of a length equal to the length of the four holes, with the uncut space between each notch of equal length. On the upper side of the valve is an arm or stud, $C^1$, the top of which is even with the top of the hopper; and the lever E, for moving the valve, is attached to such stud, and also to the outer side of the hopper, by pins or screws, so as to allow free motion, while the opposite end passes under a staple, F, which serves to keep the lever in place and regulate its throw. The depth of the notches should be sufficient to allow single seeds to lie freely therein on the bottom of the hopper, and when the valve is moved to the right or left, to move with it, and when they come over a hole in the bottom drop out. With diagonal notches the seed is passed over the holes more regularly than if made straight across the valve, though they will answer made in that way.

The operation is as follows: The seed-sower is hung in front, by means of a strap passing over the neck. It is steadied with the left hand, and with the right the lever E is moved forward and backward. The seed in the hopper passes into the notches and is carried, by the motion of the lever, alternately over the holes and over the solid parts. At the ordinary rate of walking in the open field, a motion of the lever of about sixty times a minute will drop the seed with great evenness and sufficiently thick for ordinary sowing. A more rapid motion of the lever or slower walking will sow the seed thicker, and faster walking and slower motion of the lever will sow it thinner.

Its advantages are its lightness, cheapness, the regularity with which it performs its work, and the ease with which it is operated. Other modes may be adopted of closing and opening the holes, but that described is believed to be the cheapest and simplest; though I do not wish to be understood as limiting myself to this precise manner.

What I claim as my invention, and desire to secure by Letters Patent, is—

The seed-sower, constructed and operating substantially as described.

CLARK McINTOSH.

Witnesses:
JOHN I. SEYMOUR,
JOHN G. CROCKER.